May 11, 1926.
A. ATHERTON
1,584,681
METALLIC DUPLEX SYSTEM OF TELEGRAPHY
Filed July 23, 1924
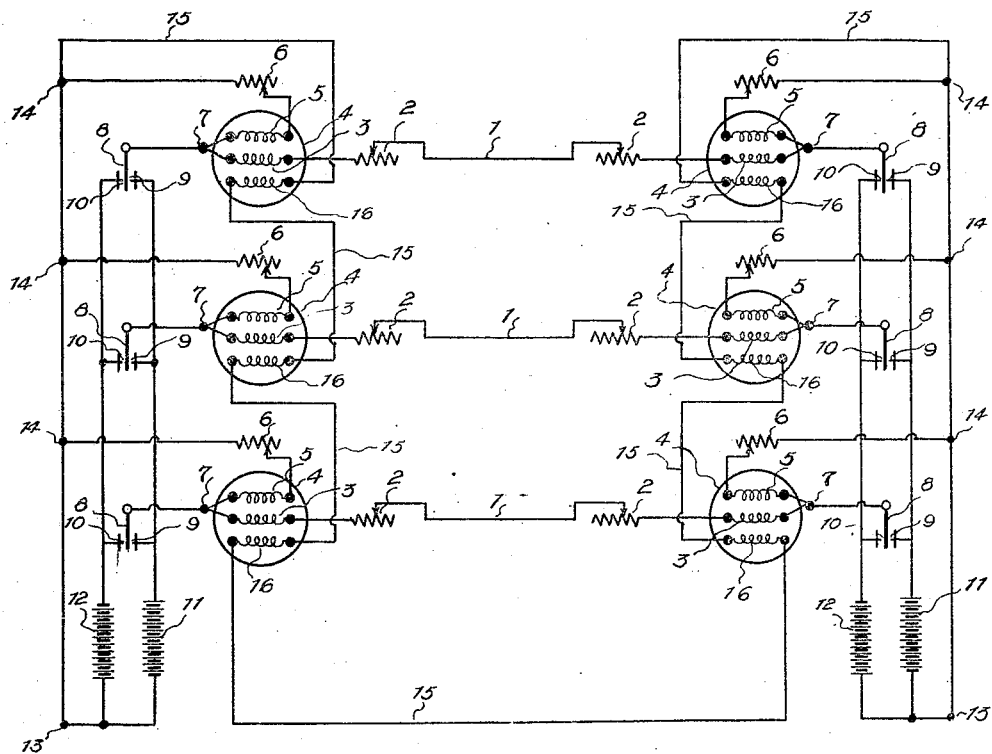
Inventor
Albert Atherton
Eugene C. Brown
Attorney Patented May 11, 1926.

1,584,681

UNITED STATES PATENT OFFICE.

ALBERT ATHERTON, OF WOODHAVEN, NEW YORK, ASSIGNOR TO THE WESTERN UNION TELEGRAPH COMPANY, OF NEW YORK, N. Y., A CORPORATION OF NEW YORK.

METALLIC DUPLEX SYSTEM OF TELEGRAPHY.

Application filed July 23, 1924. Serial No. 727,749.

The present invention relates to duplex systems of telegraphy.

As commonly used, duplex systems of the prior art utilize a single line conductor together with a ground return circuit, and a balancing artificial line at each terminal station in which an effort is made to duplicate the electrical characteristics of the line circuit in order that a perfect balance, so far as possible, may be established. Owing to the external disturbances which affect the line circuit, and the ground potential variations at the grounded terminals, the extraneous currents flowing in such lines are at times of such magnitude as to prevent the practical operation of the circuits. The ground currents become particularly troublesome during the occurrence of the aurora borealis and other atmospheric electrical disturbances, so that in certain installations the ground return must be replaced by a metallic return circuit. When this substitution is made, however, the disturbances induced in the line by induction still occur, but usually are reduced in magnitude.

Systems have been provided in which the advantages of metallic return circuits may be attained in a plurality of duplexed lines between the same points by the addition of a single return conductor which serves as a common return for all of the duplexed lines. Such systems are disclosed in copending application, Serial Number 726,868, filed July 18, 1924. In the systems disclosed in the copending case, each transmitting circuit is provided with separate sources of electrical energy for transmitting the impulses to the line. An object of the present invention is the provision of a plural duplex arrangement or net work of lines in which sources of transmitting energy common to a plurality of lines may be utilized and in which the advantages of metallic circuit operation in a plurality of circuits with a minimum number of conductors may be attained.

A further object of the invention is the provision of a simplified plural metallic duplex system in which the number of sources of electrical energy are reduced to a minimum, whereby maintenance costs are decreased and operating efficiency is increased.

Further objects of the invention will appear in the appended claims and in the following detailed description of the preferred embodiments of the invention.

Referring to the drawing, the figure shows a circuit diagram of a preferred form of the invention.

A plurality of main lines 1, are connected in series with adjustable resistances 2, and windings 3 of receiving relays 4. Each relay 4, is provided with a winding 5, connected in series with one terminal of artificial lines 6. The free terminals of windings 3 and 5 are connected to junction points 7 which in turn are connected to pole changing keys or tongues 8 of any well known single contact form of transmitter. Tongues 8 are actuated to engage contacts 9 and 10 and to apply positive and negative potentials to the respective lines 1 from batteries 11 and 12 in accordance with the signals to be transmitted to the lines. The free terminals of batteries 11 and 12 are connected at points 13, and artificial lines 6 are connected at points 14 to a metallic return conductor 15 which passes in series through windings 16 of all the relays 4.

The windings 3 and 5 are arranged so that transmitted currents passing outward from points 7 over windings 3 to lines 1 will set up magnetomotive forces which will be opposed by the magnetomotive forces set up by the currents passing outward from points 7 through windings 5 and artificial lines 6, while incoming currents will pass around windings 3 and 5 in a well known manner to cause the magetomotive forces caused thereby to add. The constants of artificial lines 6 are proportional but not equal to the main line constants, so that more current will pass through windings 5 than will pass through windings 3 with a result that the magnetic forces developed by transmitted currents in these windings will not balance. The windings 16 on relays 4 are, however, so proportioned and arranged that the magnetic effect thereof due to the returning currents, will be added to the magnetic effect of windings 3 in a manner to balance the magnetic effects of the transmitted impulses. It will be noted that for the received impulses, the direction of current in windings 3, 5 and 16 are such that the magnetomotive forces are added and the result is an increased pull on the receiving relay over and above that which may be obtained using ordinary two coil differential relays.

It will be apparent that a plurality of metallic return paths are provided in this arrangement with the addition of only one extra line, and for this reason, for the same values of applied potential higher operating currents are available than in single metallic duplex systems. For two duplex circuits on three line conductors a ratio of main circuit to artificial circuit constants of 3:2 will give excellent results; for three circuits on four conductors a ratio 4:3 may be used; for four circuits on five conductors the ratio may be 5:4 and so on, but it will be understood that these values may be varied within wide limits and the proportions of the relay windings may be varied accordingly.

By connecting together the points 13, an additional return may be added. The system will be unaffected by any disturbances in the added return. A ground return may thus be added by grounding the system at points 13. This permits the use of power sources having one terminal grounded which are generally available in telegraph offices.

Having described preferred embodiments of the invention, what is desired to be secured by Letters Patent and claimed as new is:—

1. A duplex system comprising a plurality of main line conductors, artificial lines individual to said main line conductors, a common metallic return circuit for said main line conductors, electro-responsive receiving means individual to each of said main line circuits, and a winding individual to each of said receiving means connected in said return circuit, and sources of transmitting energy common to a plurality of said main lines.

2. A telegraph system comprising a plurality of duplexed main lines, a common metallic return circuit for said main lines, said common return circuit including windings individual to each main line, transmitters individual to each of said main lines, and sources of transmitting energy common to said main lines.

3. A telegraph system comprising a plurality of lines, artificial lines individual to said main lines, and a common metallic return circuit, the proportion of the constants of the artificial lines to the main lines being a function of the number of main lines.

4. A system as in claim 3, the proportion being the number of lines to the number of lines plus one.

In testimony whereof I affix my signature.

ALBERT ATHERTON.